(12) United States Patent
Stier et al.

(10) Patent No.: US 9,484,698 B2
(45) Date of Patent: Nov. 1, 2016

(54) ELECTRICAL OUTLET DRYING BOOT

(71) Applicants: Gerrett Stier, Fort Wayne, IN (US); Chris Laney, Churubusco, IN (US)

(72) Inventors: Gerrett Stier, Fort Wayne, IN (US); Chris Laney, Churubusco, IN (US)

( * ) Notice: Subject to any disclaimer, the term of this patent is extended or adjusted under 35 U.S.C. 154(b) by 128 days.

(21) Appl. No.: 14/461,642

(22) Filed: Aug. 18, 2014

(65) Prior Publication Data

US 2016/0049763 A1    Feb. 18, 2016

(51) Int. Cl.
*B21D 39/04*    (2006.01)
*H01R 43/00*    (2006.01)
*B21K 1/16*    (2006.01)

(52) U.S. Cl.
CPC ............. *H01R 43/005* (2013.01); *B21K 1/16* (2013.01)

(58) Field of Classification Search
USPC ........................................................ 29/282
See application file for complete search history.

(56) References Cited

U.S. PATENT DOCUMENTS

| | | | | |
|---|---|---|---|---|
| 5,419,059 A * | 5/1995 | Guasch | ................ | E04B 1/7092 15/405 |
| 6,462,278 B1 * | 10/2002 | Vrame | ................ | H02G 3/14 174/66 |
| 6,683,248 B2 * | 1/2004 | Vrame | ................ | H02G 3/14 174/50 |
| 6,927,341 B1 * | 8/2005 | Crane | ................ | H02G 3/14 16/DIG. 2 |
| 6,956,169 B1 * | 10/2005 | Shotey | ................ | H02G 3/121 174/50 |
| 8,563,876 B1 * | 10/2013 | Gretz | ................ | H01R 13/59 174/541 |
| 8,658,894 B1 * | 2/2014 | Witherbee | ................ | H02G 3/14 174/50 |
| 2009/0183891 A1 * | 7/2009 | Kramer, Jr. | ............ | H01R 13/46 174/57 |
| 2009/0272558 A1 * | 11/2009 | Compagnone, Jr. | ...... | H02G 3/14 174/58 |

* cited by examiner

*Primary Examiner* — Alvin Grant
(74) *Attorney, Agent, or Firm* — Jacque R. Wilson; Carson Boxberger LLP (57) ABSTRACT

An apparatus for attaching duct work to an electrical outlet or electrical switch, said apparatus comprising: a generally cylindrical tube having a first end having a first diameter and a second end having a second diameter where said second diameter larger than said first diameter; a tapered wall that connects said first and second ends; at least two slots disposed through said tapered cylindrical wall; a gasket disposed about the perimeter of the said second end; at least one bracket, said bracket comprising at least two tabs, said tabs sized and oriented to be inserted into said slots, where said bracket is disposed across the diameter of said second end; means for selectively and releasably attaching said bracket to an electrical outlet.

9 Claims, 9 Drawing Sheets

ELECTRICAL OUTLET DRYING BOOT

BACKGROUND

1. Field of the Art

The present invention relates generally to devices used to remove moisture from physical structures. More specifically, the present invention relates to an attachment for connecting a water removal device around electrical outlets in the walls of homes and other buildings.

2. Description of the Prior Art

Water damage restoration is the process of restoring a property back to pre-loss condition after sustaining any level of water damage. While there are currently no government regulations in the United States dictating procedures, there are standards for water damage restoration.

A professional water damage restoration service documents the materials that are affected by the water damage and refers to industry standard pricing guides in order to determine the proper value of the residence's materials lost and their service.

Water damage services include the inspection of the affected area(s) with water sensing equipment such as probes and other infrared tools in order to determine the source of the damage, and possible extent of area affected. Restoration services would then be rendered to the residence in order to dry the structure, sanitize any affected or cross contaminated areas, and deodorize all affected areas and materials. After the labor is completed, water damage equipment including, but not limited to, air movers, air scrubbers, dehumidifiers, wood floor drying systems, and sub floor drying equipment is left in the residence. After a period of two to three days are the labor is completed, a reevaluation of the residence is taken to monitor the drying process, and any equipment not further needed is removed as to keep the charges under control.

One of the first steps in any water damage restoration project is to remove excess water and moisture from the building. During the process removing water, the interior walls of a building need to be addresses with fans and other air movers. Those of skill in the art, often remove electrical outlets so that air can flow into the space between dry wall brackets. When electrical outlets are not removed, it is still desirable to maximize the flow of air into the walls. In either of these instances, those of skill in the art often connect a hose from an air mover to the a wall via the hole left by a removed outlet or connect a hose around the outlet using zip ties, duct tape or other crude methods. Unfortunately, these methods do not reliably connect a vacuum hose to a wall in the desired location.

For example, U.S. Pat. No. 3,684,819 discloses a flexible boot for an electrical receptacle having an open end and a closed end, and a peripheral, outwardly-extending, resilient flange which depends from the open end. The closed end of the boot is provided with areas of reduced thickness which are adapted to be pierced by electrical leads connected to the receptacle. The boot is employed in combination with an electrical outlet box and a receptacle situated therein so that the receptacle is surrounded by the boot and the resilient flange of the boot is held between the outer rim of the outlet box and a flange on the receptacle in a sealing relationship.

Another prior art reference, U.S. Pat. No. 4,134,636, discloses the combination of an electrical outlet box with an under plate wherein the outlet box has end walls and side walls and the under plate is a molded plastic insulator panel having a center tubular portion sized for telescopic engagement with the outlet box, the center portion being it continuous wall defining an open center area in the plate, and the plate having a continuous peripheral portion for engaging a building surface when the outlet box is positioned in a hole in such surface and the center portion insulating terminal portions of an associated outlet receptacle.

Yet another prior art reference, U.S. Pat. No. 5,212,351, discloses an insulating boot for use with an electrical device that is attached to an outlet box. The box is attached to wall studs and may hold one or more electrical device, such as snap or dimmer switches, electrical outlets, television cables, telephone jacks and the like. The boot is made of a non-conducting, elastic material in the form of a strip the ends of which adhere to form a loop that snaps around the circumference of the device. A second strip follows a second circumference around the back of the device and attaches by adhering to the first strip at a position between the ends of the first strip so as to interfere with the attachment of the two ends of the first strip. The insulating boot prevents the shorting of the terminal of a device against the grounded outlet box wall or against the terminals of an adjacent device.

However, none of the known prior art discloses a device suitable for connecting water removal devices from the interior walls of homes and from around electrical outlets reliably and without removing the outlets. The present invention addresses these and other omissions of the prior art.

SUMMARY

The present invention comprises an apparatus for attaching duct work to an electrical outlet or electrical switch, said apparatus comprising: a generally cylindrical tube having a first end having a first diameter and a second end having a second diameter where said second diameter larger than said first diameter; a tapered wall that connects said first and second ends; at least two slots disposed through said tapered cylindrical wall; a gasket disposed about the perimeter of the said second end; at least one bracket, said bracket comprising at least two tabs, said tabs sized and oriented to be inserted into said slots, where said bracket is disposed across the diameter of said second end; and means for selectively and releasably attaching said bracket to an electrical outlet.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only. The drawings are best described as follows.

DETAILED DESCRIPTION OF THE EMBODIMENTS

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

All of the implementations described below are exemplary implementations provided to enable persons skilled in the art to make or use the embodiments of the disclosure and are not intended to limit the scope of the disclosure, which is defined by the claims. In the present description, the terms "upper", "lower", "left", "rear", "right", "front", "vertical", "horizontal", and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
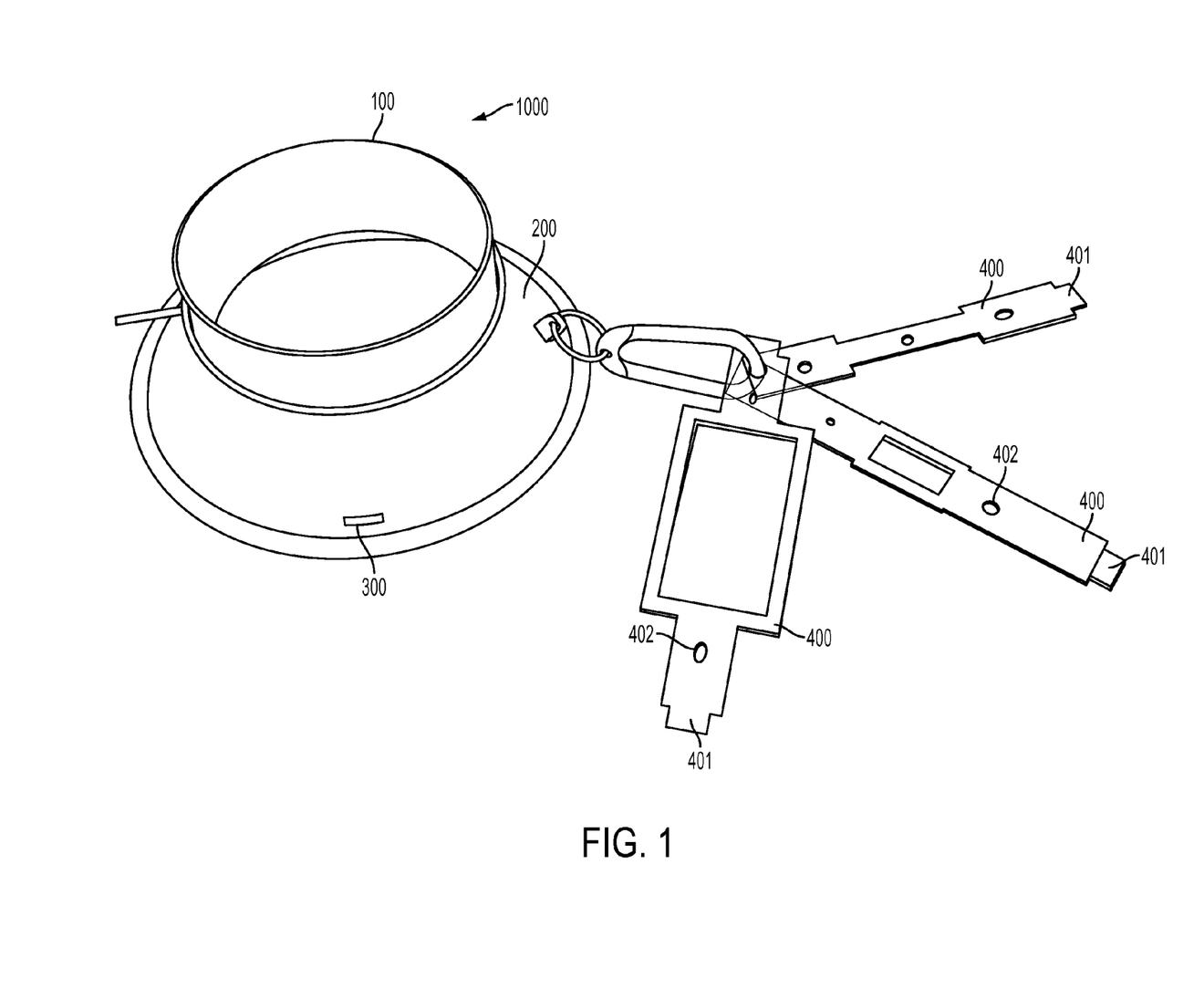
FIG. 1 shows a top perspective view of an exemplary device according to the present invention.

FIG. 1 shows a top perspective view of an exemplary device according to the present invention. As illustrated in FIG. 1, sealing boot 1000 comprises a generally conical first section 100 and an outwardly tapered conical second section 200. Sealing boot 1000 can be manufactured from any material sufficiently flexible to affect the desired seal. For electrical installations a dielectric material such as natural rubber, neoprene, silicone rubber, styrene-butadiene rubber, fluorocarbon resin, polyacrylate, polyurethane, and the like, are preferred. From the standpoint of its dielectric properties, cost, and ease of manufacture, moldable rubber is particularly preferred.

Referring still to FIG. 1, sealing boot 1000 of the present invention further comprises at least one releasably attachable mounting bracket 400. Mounting bracket 400 generally comprises means to selectively securely attach mounting bracket 400 to the front of a common electrical outlet. In one exemplary embodiment, a plurality of clips of various designs are attached to boot 1000 via a releasable clip, ring, or combination of the same as illustrated in FIGS. 1 and 2.

Figure 2:
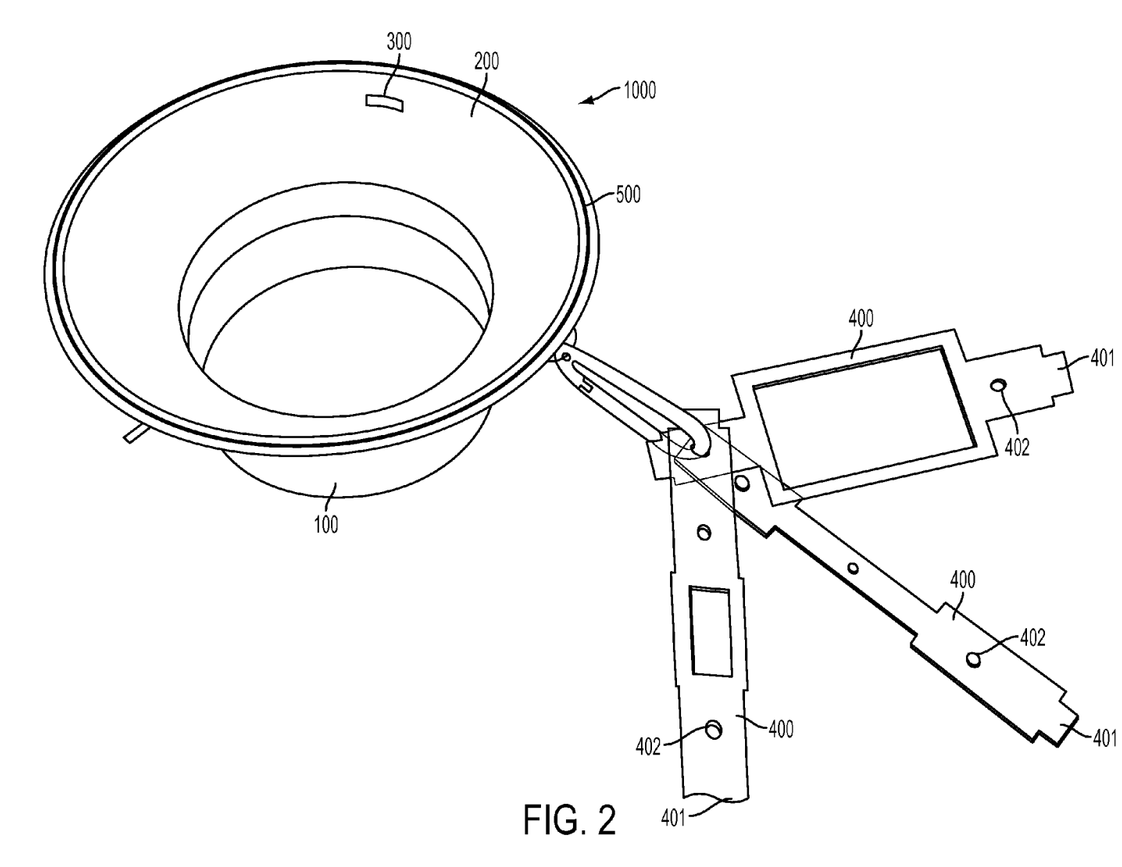
FIG. 2 shows a bottom perspective view of an exemplary device according to the present invention.

Referring now to FIG. 2, there is shown a bottom perspective view sealing boot 1000 of the present invention. As illustrated in FIG. 2, sealing boot 1000 further comprises sealing ring 500 disposed around the inner perimeter of tapered conical section 200 of sealing boot 1000.

Figure 3:
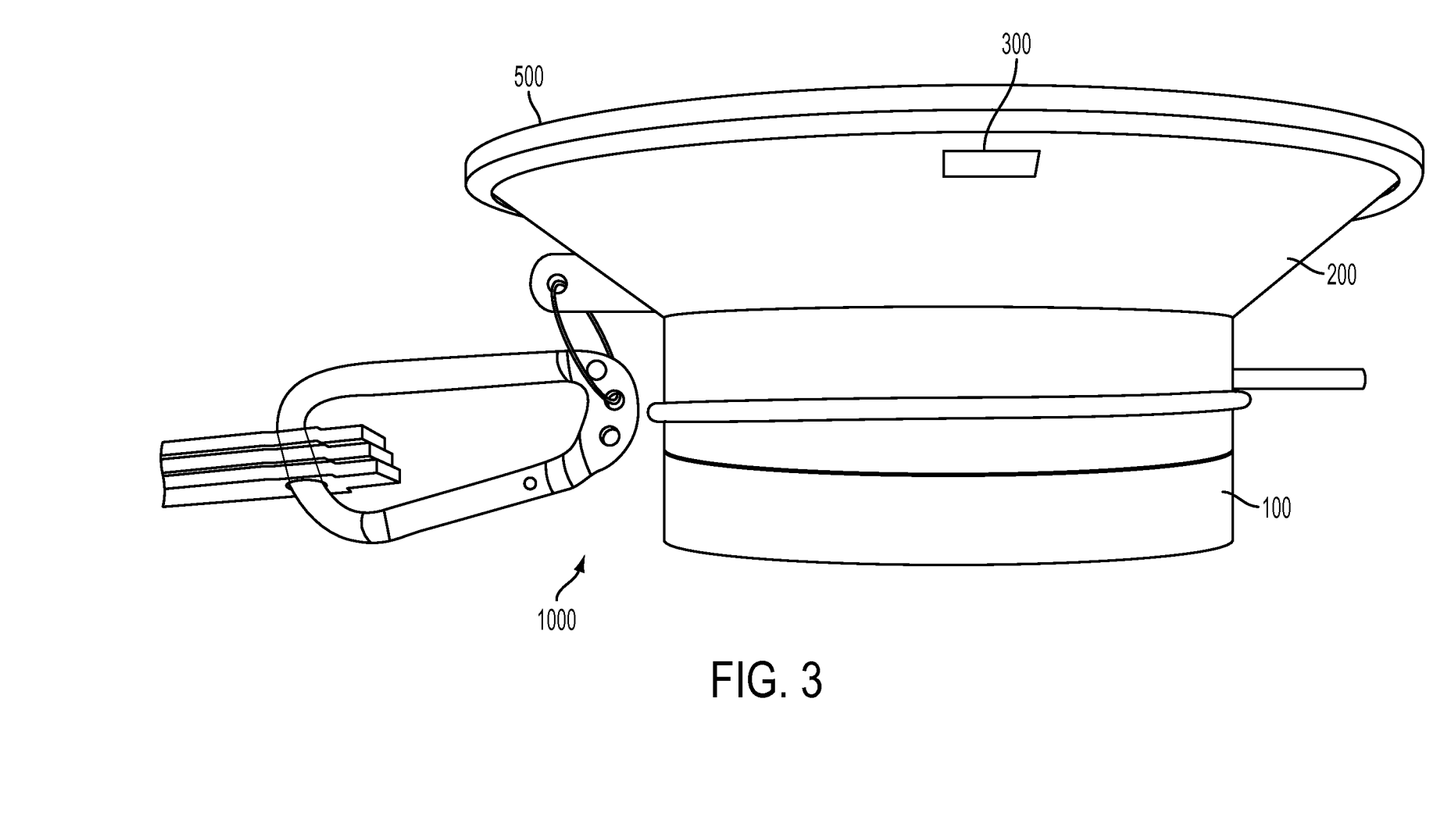
FIG. 3 shows a side view of an exemplary device according to the present invention in a first vertical orientation.
Figure 4:
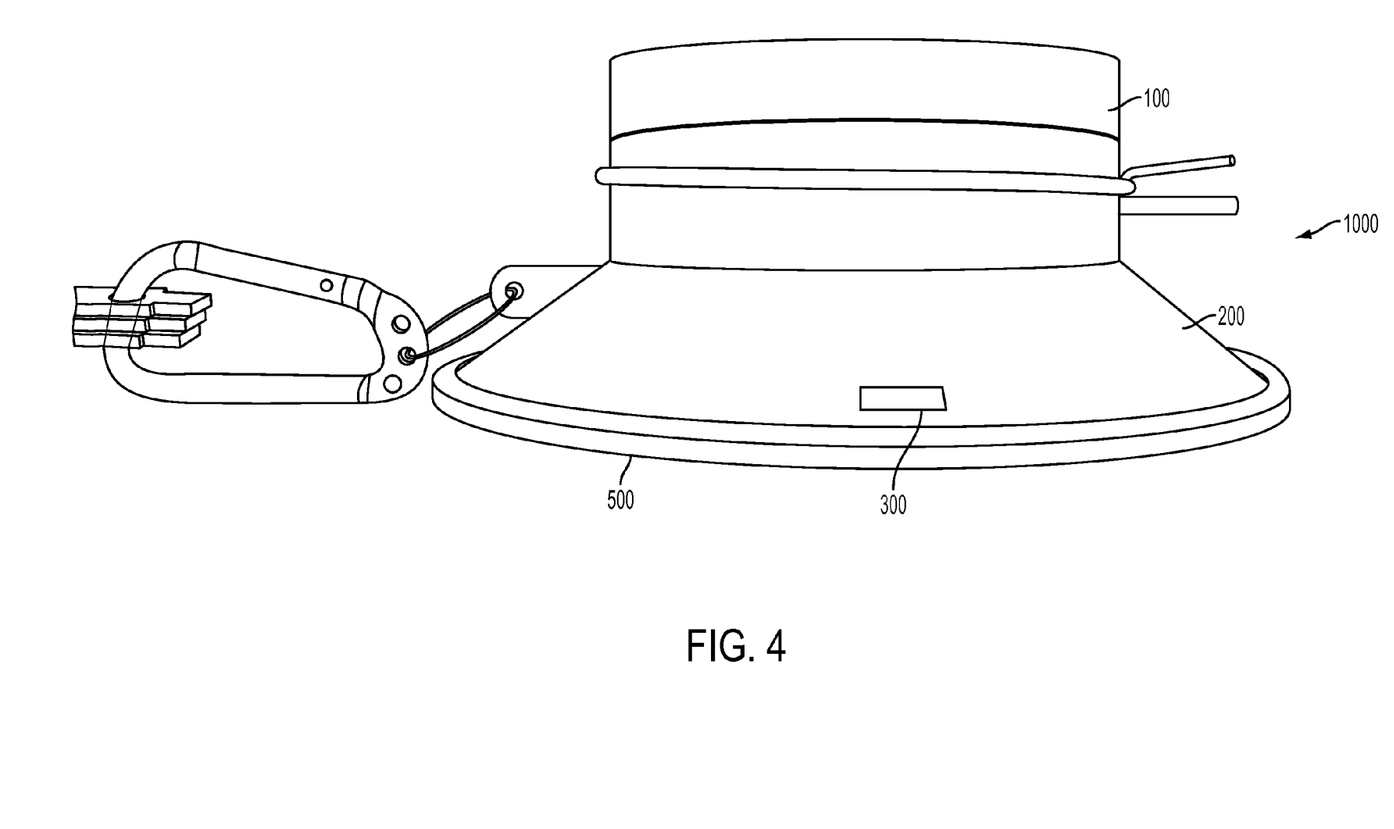
FIG. 4 shows a side view of an exemplary device according to the present invention in a second vertical orientation.

FIGS. 3 and 4 show side elevational views of sealing boot 1000. As shown in FIGS. 3 and 4, sealing boot 1000 comprises straight conical portion 100 and outwardly tapered conical portion 200. Tapered conical portion 200 further comprises tab receiving slots 300.

Turning briefly again to FIGS. 1 and 2, there are shown a plurality of mounting brackets 400. Mounting bracket 400 generally comprise an elongated cuboid shape having opposing ends. Each end of mounting bracket 400 comprises a tab 401. Mounting brackets 400 generally comprises a thermoplastic or thermoset material such a polystyrene or the like. Preferably, mounting bracket 400 comprises a mostly transparent and non electrically conductive material. However, those of skill in the art will appreciate a metal bracket may be used within the scope of the present invention.

Figure 5:
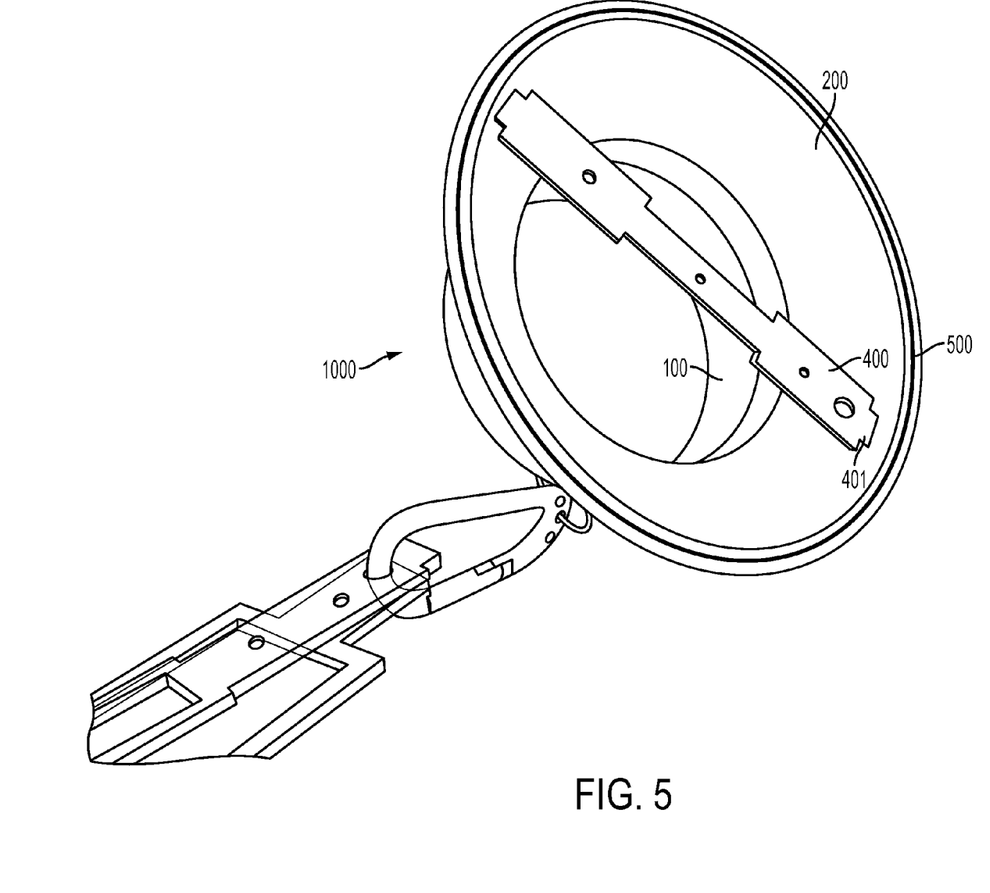
FIG. 5 shows a bottom perspective view of an exemplary device according to the present invention with an interior bracket attached.
Figure 6:
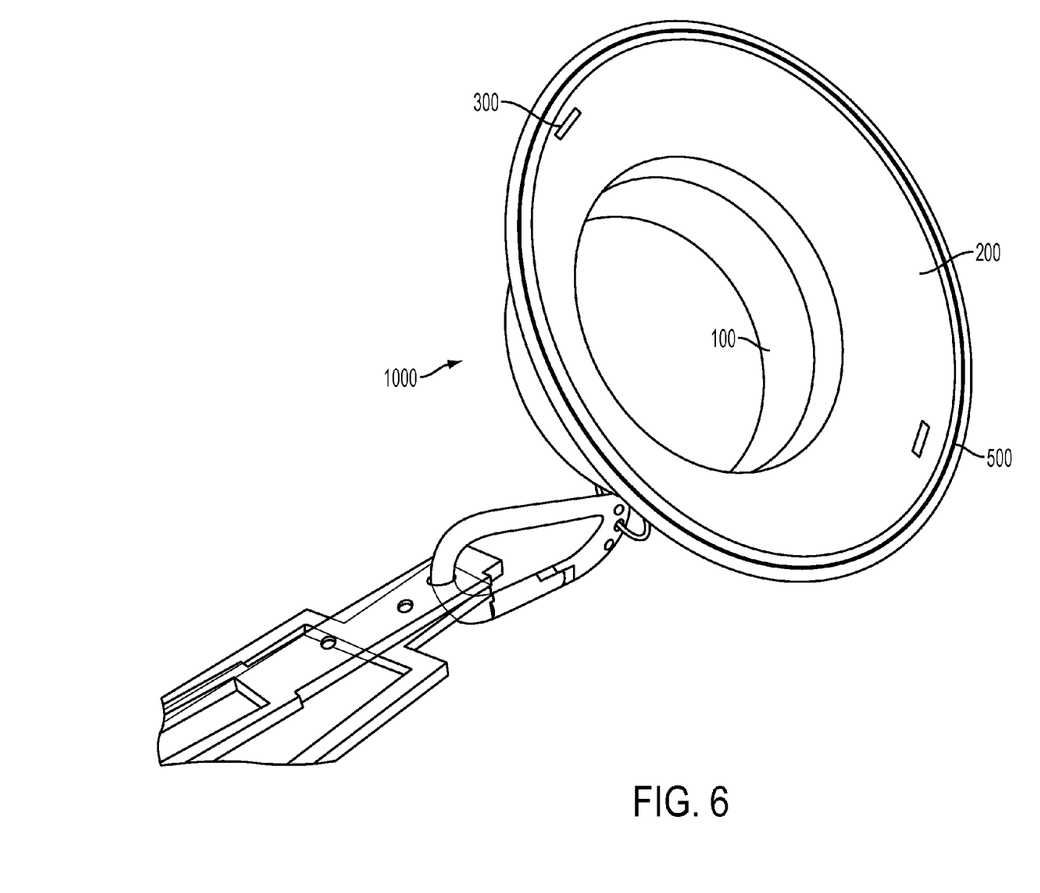
FIG. 6 shows a bottom perspective view of an exemplary device according to the present invention with an interior bracket attached.

Referring now to FIG. 5 and FIG. 6, there are shown bottom perspective views of sealing boot 1000. FIG. 5, shows sealing boot 1000 with mounting bracket 400 attached. As illustrated in FIGS. 1 and 2, bracket 400 further comprises opposing tabs 401. Turning again to FIG. 5, tabs 401 are selectively inserted into tab receiving slots 300 of tapered conical portion 200 of sealing boot 1000 to releasably connect a selected bracket 400 to sealing boot 1000 across the inner diameter of outwardly tapered conical portion 200.

Figure 7:
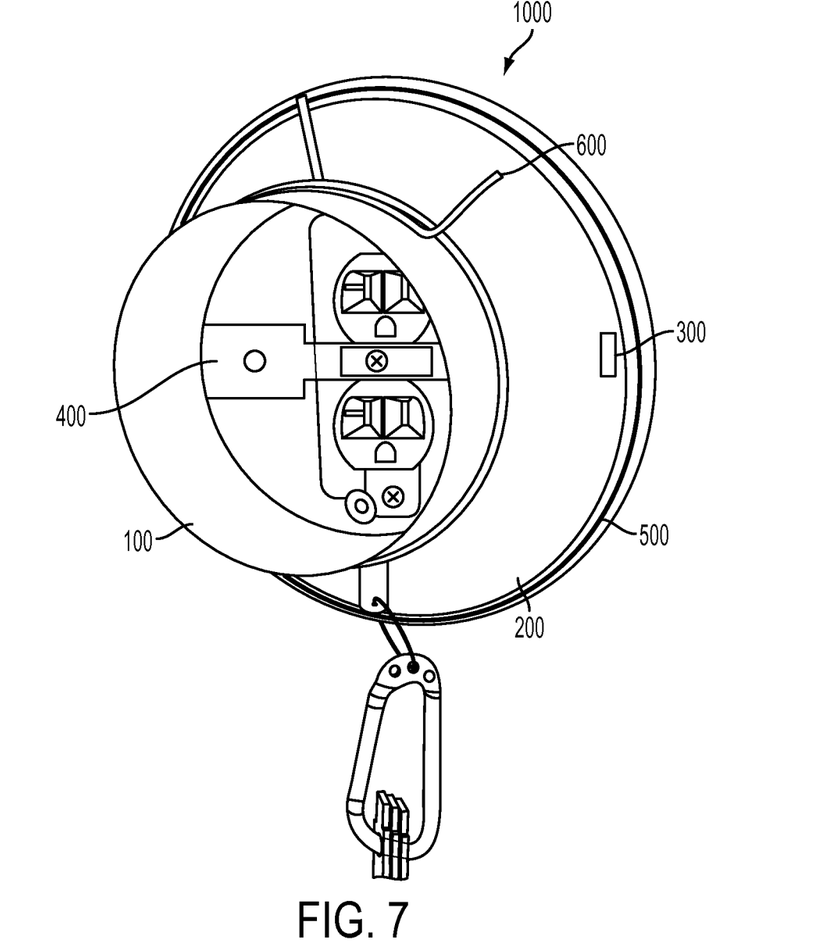
FIG. 7 shows a perspective view of an exemplary device according to the present invention with the device attached to a wall.
Figure 8:
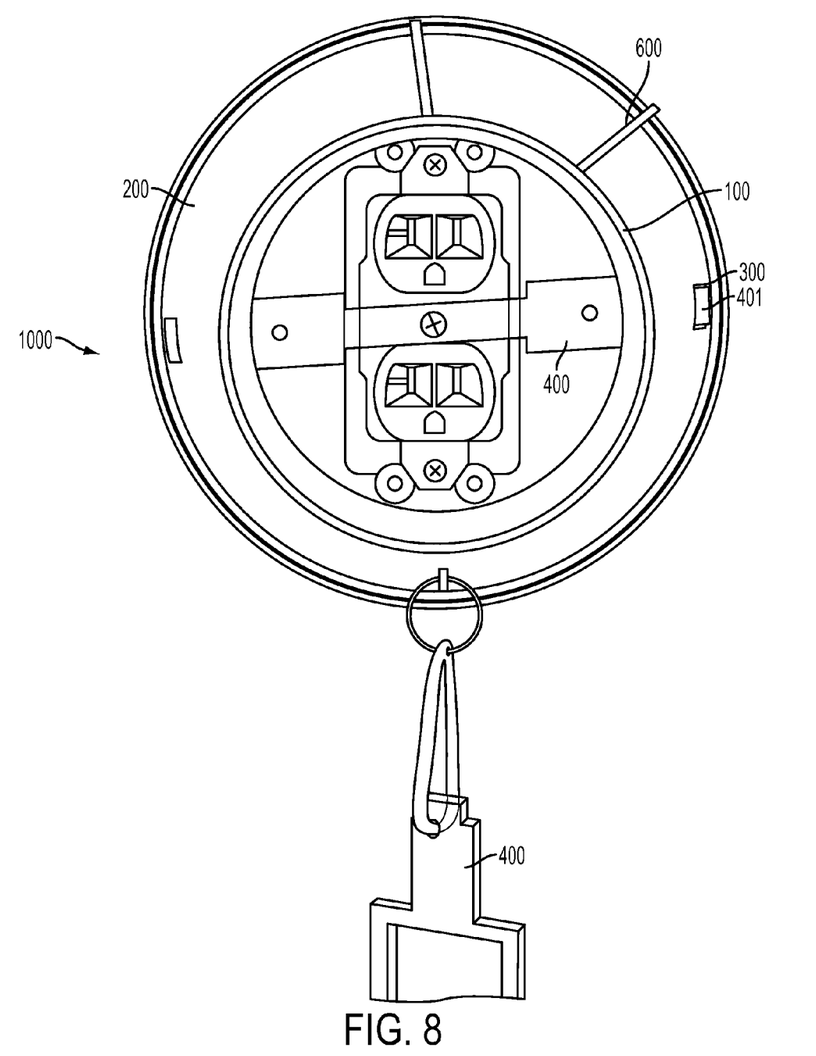
FIG. 8 shows a top view of an exemplary device according to the present invention with the device attached to a wall.

Turning now to FIG. 7 and to FIG. 8, there are shown a top perspective view and top view, respectively, of sealing boot 1000 to a common wall outlet. As illustrated in FIGS. 7 and 8, mounting bracket 400 further comprises means to securely releasably attach mounting bracket 400 to the front of an electrical outlet. Generally, said means comprises a bore 402 through which a screw can be used to secure bracket 400 to an electrical outlet. Mounting brackets 400 of the present invention may be adapted to be used in connection with any electrical outlet or switch, such as a duplex receptacle, a toggle switch, or decora style electrical device.

Figure 9:
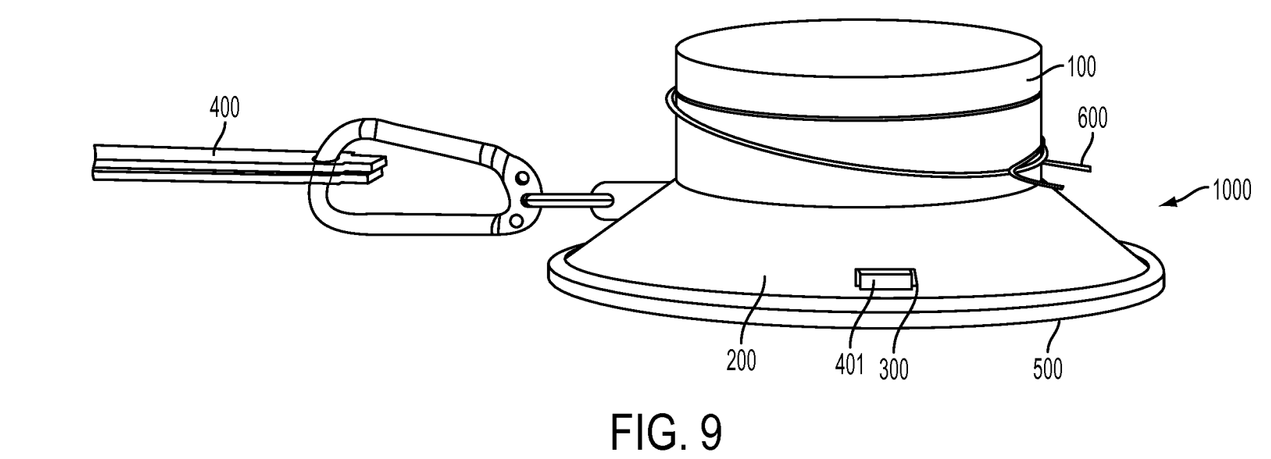
FIG. 9 shows a side view of an exemplary device according to the present invention with the device attached to a wall.

FIG. 9 shows a side elevation view of sealing device 1000 attached to a wall. In use, an air mover such as a vacuum or blower is attached to a flexible hose. The hose is carried to or directed toward the desired point of use. In situations where it is desirable to remove air from the interior a wall, air is often forced into or out of the wall around an electrical outlet. By use of the present invention, a flexible hose as described herein can be releasably attached to sealing boot 1000. As illustrated in FIG. 9, sealing boot 1000 may further comprise an exterior coil clip 600 for attaching a hose to sealing boot 1000. Those of skill in the art will appreciate that other securing means, such as rubber bands, string, cord, tape, and zip ties may also be used. Additionally, the hose and or straight conical portion 100 may comprise cooperating protrusions and indentions to allow for a sufficiently rigid connection between the hose and sealing boot or the hose may be comprised of an elastic material that readily secures to the exterior of sealing boot 1000. Of course, those of skill in the art will also appreciate that the present sealing boot 1000 may also be used with a less rigid connection between it and any corresponding hose, or sealing boot 1000 may be directly connected to a desired air mover.

The above-described embodiments are merely exemplary illustrations set forth for a clear understanding of the principles of the invention. Many variations, combinations, modifications, or equivalents may be substituted for elements thereof without departing from the scope of the invention. It should be understood, therefore, that the above description is of an exemplary embodiment of the invention and included for illustrative purposes only. The description of the exemplary embodiment is not meant to be limiting of the invention. A person of ordinary skill in the field of the invention or the relevant technical art will understand that variations of the invention are included within the scope of the claims.

The invention claimed is:

1. An apparatus for attaching duct work to an electrical outlet or electrical switch, said apparatus comprising: a generally cylindrical tube having a first end having a first diameter and a second end having a second diameter where said second diameter larger than said first diameter; a tapered wall that connects said first and second ends; at least two slots disposed through said tapered cylindrical wall; a gasket disposed about a perimeter of the said second end; at least one bracket, said bracket comprising at least two tabs, said tabs sized and oriented to be inserted into said slots, where said bracket is disposed across the diameter of said second end; means for selectively and releasably attaching said bracket to an electrical outlet.

2. The apparatus of claim 1, wherein the means for selectively and releasably attaching said bracket to said electrical outlet comprises a bore through the bracket and a screw for threadably engaging the outlet.

3. The apparatus of claim 1, further comprising a means for selectively and releasably attaching a tube to the outside of the cylinder.

4. The apparatus of claim 3, wherein the means for selectively and releasably attaching said tube to the outside of the cylinder comprises a circular compressive clip.

5. The apparatus of claim 1, wherein said bracket is shaped to fit with a duplex receptacle.

6. The apparatus of claim 1, wherein said bracket is shaped to fit with a toggle switch.

7. The apparatus of claim 1, wherein said bracket is shaped to fit with a decora style electrical device.

8. The apparatus of claim 1, wherein said gasket comprises a dielectric material.

9. The apparatus of claim 1, wherein said gasket comprises a material selected from the group consisting of natural rubber, synthetic rubber, neoprene, silicone rubber, styrene-butadiene rubber, elastomeric resin, fluorocarbon resin, polyacrylate, and polyurethane.

* * * * *